United States Patent [19]

Oshiba

[11] Patent Number: 5,335,192

[45] Date of Patent: Aug. 2, 1994

[54] PORTABLE COMPUTER WITH PIVOTALLY MOUNTED COVER

[75] Inventor: Hirokazu Oshiba, Tokyo, Japan

[73] Assignee: Nippon Steel Corporation, Tokyo, Japan

[21] Appl. No.: 682,089

[22] Filed: Apr. 9, 1991

[30] Foreign Application Priority Data

Apr. 11, 1990 [JP] Japan .................................. 2-96752
Apr. 11, 1990 [JP] Japan .................................. 2-96753
Apr. 24, 1990 [JP] Japan .................................. 2-109782

[51] Int. Cl.⁵ .............................................. G06F 1/00
[52] U.S. Cl. ............................................... 364/708.1
[58] Field of Search .................... 364/708, 709.12; 361/384; D14/106

[56] References Cited

U.S. PATENT DOCUMENTS

| | | | |
|---|---|---|---|
| D. 294,029 | 2/1988 | Nishiyama et al. | D14/106 |
| D. 305,883 | 2/1990 | Burton | D14/106 |
| D. 308,051 | 5/1990 | Sakai | D14/106 |
| D. 311,741 | 10/1990 | Sakai | D14/106 |
| D. 315,553 | 3/1991 | Davis et al. | D14/106 |
| D. 317,302 | 6/1991 | Shibuya et al. | D14/106 |
| D. 317,759 | 6/1991 | Azima | D14/106 |
| D. 318,046 | 7/1991 | Ichikawa | D14/106 |
| 4,084,213 | 4/1978 | Kirchner et al. | 361/384 |
| 4,497,036 | 1/1985 | Dunn | 364/708 |
| 4,824,268 | 4/1989 | Diernisse | 364/709.12 |
| 5,068,652 | 11/1991 | Kobayashi | 364/708 |
| 5,077,551 | 12/1991 | Saitou | 364/708 |
| 5,115,374 | 5/1992 | Hongoh | 361/393 |

OTHER PUBLICATIONS

Toshiba T1600 Portable Personal Computer User's Manual, Dec. 1988.
Toshiba T5200 Portable Personal Computer Reference Manual, 1987.

Primary Examiner—Long T. Nguyen
Attorney, Agent, or Firm—Steven M. Rabin

[57] ABSTRACT

A portable computer having a lid portion pivotally mounted to a body which includes an array of keys. A display section of the lid is aligned, for ease of viewing by an operator, with a subarray of the keys used to display ASCII characters on the display section. For a QWERTY arrangement of keys, a center line of the display section may be aligned, for example, with a line bisecting a row of keys which includes the A through L keys, midway between the F and J keys. The display section and subarray of keys are not aligned with center lines of the lid and body respectively, so that there is more space on one side of the lid adjacent to the display section available for mounting control hardware. The side with more space is used for mounting such hardware as rheostats for adjusting the brightness and contrast of an image on the display section, a back-light arrangement for the display section, an inverter for driving the back-light arrangement, and operation-related indicators.

16 Claims, 4 Drawing Sheets

PORTABLE COMPUTER WITH PIVOTALLY MOUNTED COVER

BACKGROUND OF THE INVENTION

1. Field of the Invention:

The present invention relates to a portable computer that is easy to carry around.

2. Description of the Related Art:

Prior art portable computers have one disadvantage that is a dilemma. On a typical conventional portable computer, the longitudinally center Of its alphanumeric key arrangement is not aligned with that of its body. Such a key arrangement includes the universal QWERTY key arrangement whose keys correspond to ASCII characters. On the other hand, the longitudinal center of the display section of such a computer is centered in the lid portion thereof (as disclosed in U.S. Pat. No. 4497036). If the user positions himself at the center of this key arrangement so as to operate the keyboard in the easiest manner, he finds the display section out of center from the key arrangement and thus rather awkward to watch. Conversely, if the user positions himself at the longitudinally center of the display section so as to watch the screen in the easiest manner, he finds the keys corresponding to the ASCII characters, out of the center with respect to the display section and thus rather awkward to operate.

The portable computer is required physically to incorporate varieties of parts in the limited internal space thereof. This in turn requires making the parts smaller and optimally laying them out so as to make the most of the available space. It is for these reasons that the parts are arranged in a highly concentrated manner in the body and lid portion of the portable computer. Meanwhile, on the typical conventional portable computer, an inverter for driving LCD back-lights is installed inside the body, taking up additional space. If space for inverter is not necessary, hardware for performing new functions may be added in such space.

Furthermore, the conventional portable computer has a contrast adjusting dial and a brightness adjusting dial, mounted on its body. Since these dials are associated with the display section, the wiring between the dials and the display section is necessarily long. From an operator's point of view, all display-related controls should preferably be mounted on the lid portion that comprises the display section.

On the portable computer, the indicators including those related to the power supply thereof are all located in the top left corner of the keyboard. With the lid portion closed, these indicators are still visible from the outside (e.g., on Toshiba's portable computer J3100SS). However, there is obviously no need for the operation-related indicators to be visible when the lid portion is closed; these indicators need only be seen when the keyboard is operated. On the other hand, power-related indicators should preferably be seen and checked whether or not the computer is in use. The indicator section needs circuits that drive individual indicators and their wiring; again the circuits and the wiring take up additional space. However, these indicators do not occupy as much space as, say, the batteries do. And given their light-weight characteristic, the operation-related indicators are not required to be attached to the body. If the operation-related indicators are mounted somewhere else, the evacuated space in the body may accommodate hardware for performing other functions which will boost the overall performance of the computer.

SUMMARY OF THE INVENTION

It is therefore an object of the present invention to provide a portable computer whose keys are is so positioned with respect to the body that it is easier to operate.

It is another object of the invention to provide a portable computer whose space utilization efficiency is enhanced.

In carrying out the invention, and according to a first aspect thereof, there is provided a portable computer comprising: a body comprising a key arrangement, including an arrangement of keys for ASCII (American Standard Code for Information Exchange characters (hereinafter "ASCII keys" or "ASCII key arrangement"); a lid portion containing a display section for displaying the ASCII characters in accordance with signals generated by operation of ASCII keys; and a hinge portion for rotatably, connecting the lid portion with the body, the lid portion and the body being rotatably supported by a rotating shaft; wherein two intersection points coincide with each other, one of the intersection points being formed by a perpendicular to the rotating shaft from a given point on a line symmetrically bisecting the display section longitudinally and by the rotating shaft of the hinge portion crossing the perpendicular, the other intersection point being formed by a perpendicular to the rotating shaft from a given point on a line symmetrically bisecting the ASCII key arrangement and by the rotating shaft crossing the perpendicular.

According to a second aspect of the invention, there is provided a portable computer comprising: a body comprising an ASCII key arrangement; a lid portion containing a display section for displaying the ASCII characters in accordance with signals generated by operation of ASCII keys, the display section being asymmetrically displaced to the right or to the left with respect to the center of the lid portion; and a hinge portion for rotatably connecting the lid portion with the body, the lid portion and the body being rotatably supported by a rotating shaft; wherein two intersection points coincide with each other, one of the intersection points being formed by a perpendicular to the rotating shaft from a given point on a line symmetrically bisecting the display section longitudinally and by the rotating shaft of the hinge portion crossing the perpendicular, the other intersection point being formed by a perpendicular to the rotating shaft from a given point on a line symmetrically bisecting the ASCII key arrangement, and by the rotating shaft crossing the perpendicular.

According to a third aspect of the invention, there is provided a portable computer comprising: a body containing a keyboard; a lid portion including a display section having a back-light arrangement; and a hinge portion for rotatably connecting the body with the lid portion; wherein an inverter for driving the back-light arrangement is provided in the lid portion.

According to a fourth aspect of the invention, there is provided a portable computer comprising: a body containing a keyboard; a lid portion including a display section having a back-light arrangement; and a hinge portion for rotatably connecting the body with the lid portion; wherein a contrast adjusting means and a brightness adjusting means for adjusting the contrast and the brightness of the display section, respectively, are sliding type rheostats each positioned close to the display section contained in the lid portion.

According to a fifth aspect of the invention, there is provided a portable computer comprising: a body containing a keyboard having a plurality of keys; a lid portion including a display section; and a hinge portion for rotatably connecting the body with the lid portion; wherein operation-related indicators and power-related indicators are provided on the lid portion and on the body, respectively.

The first and the second aspects of the invention involve two symmetrically bisecting lines existing on the same perpendicular plane, one of the lines symmetrically bisecting the ASCII key arrangement longitudinally (e.g., center line passing between the F arid the J keys or between the B and the N keys to bisect a subarray such as a single line of ASCII keys in a QWERTY key arrangement), the other line symmetrically bisecting the display section longitudinally. This layout allows the operator to align himself exactly with the keyboard where it is easiest to operate as well as with the LCD section where it is easiest to look at. The operability of the computer is thus enhanced.

The third aspect of the invention involves having the back-light arrangement of the display section driven by the inverter located in the lid portion containing the display section. This inverter layout leaves a free space in the body that may accommodate additional capabilities such as a hard disk drive, allowing the computer to boost its performance.

The fourth aspect of the invention involves having the display-related controls concentrated on the lid portion. This layout also leaves a free space in the body, and contributes to making the capabilities of computer greater than ever.

The fifth aspect of the invention involves having the operation-related indicators provided on the lid portion. By locating the operation-related indicators and their associated parts there an additional free space is left in the body. This space may also be utilized to accommodate hardware for providing the computer with further capabilities.

Figure 1:
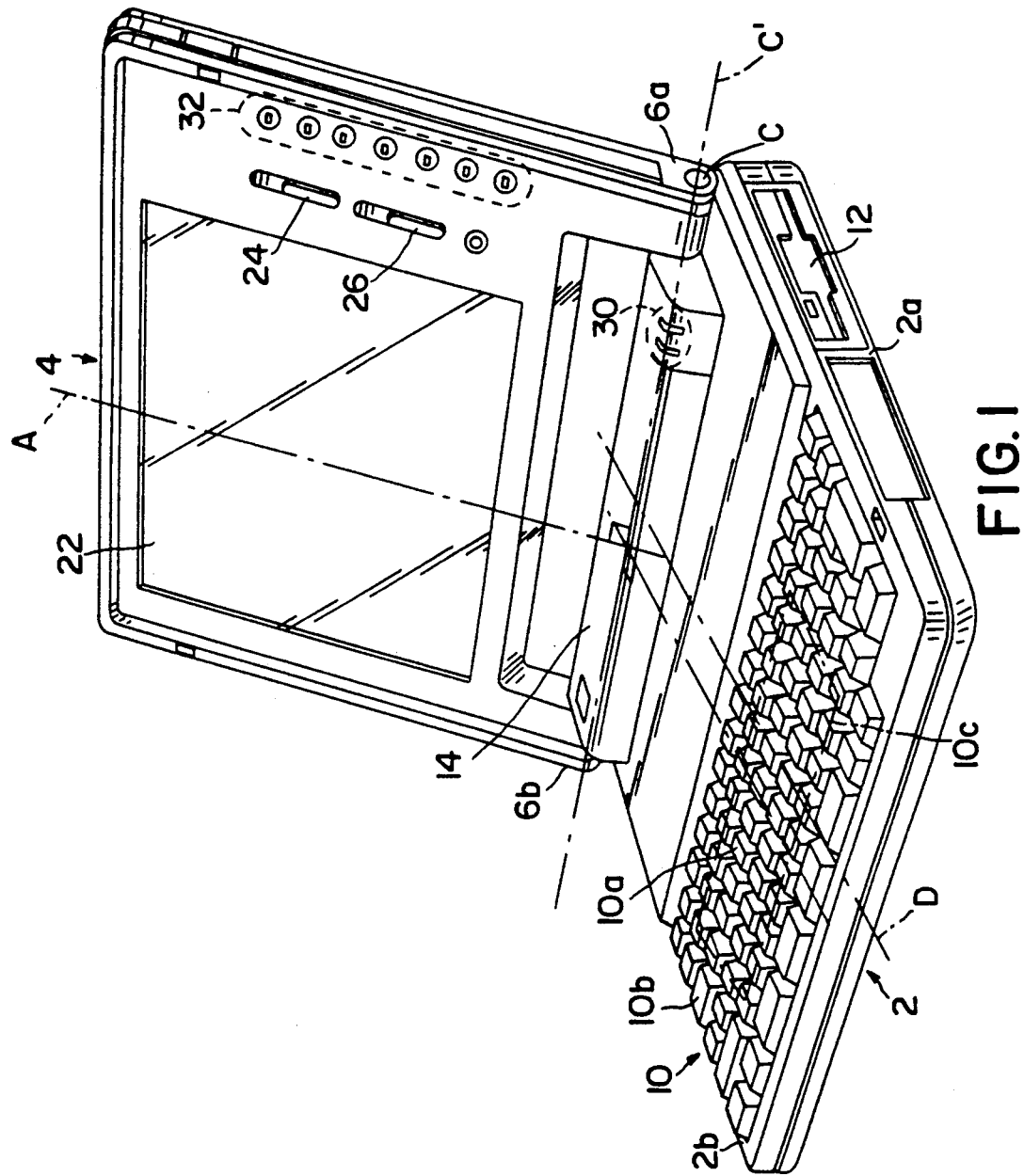
FIG. 1 is a perspective view of a portable computer according to preferred embodiment of the invention.
Figure 2:
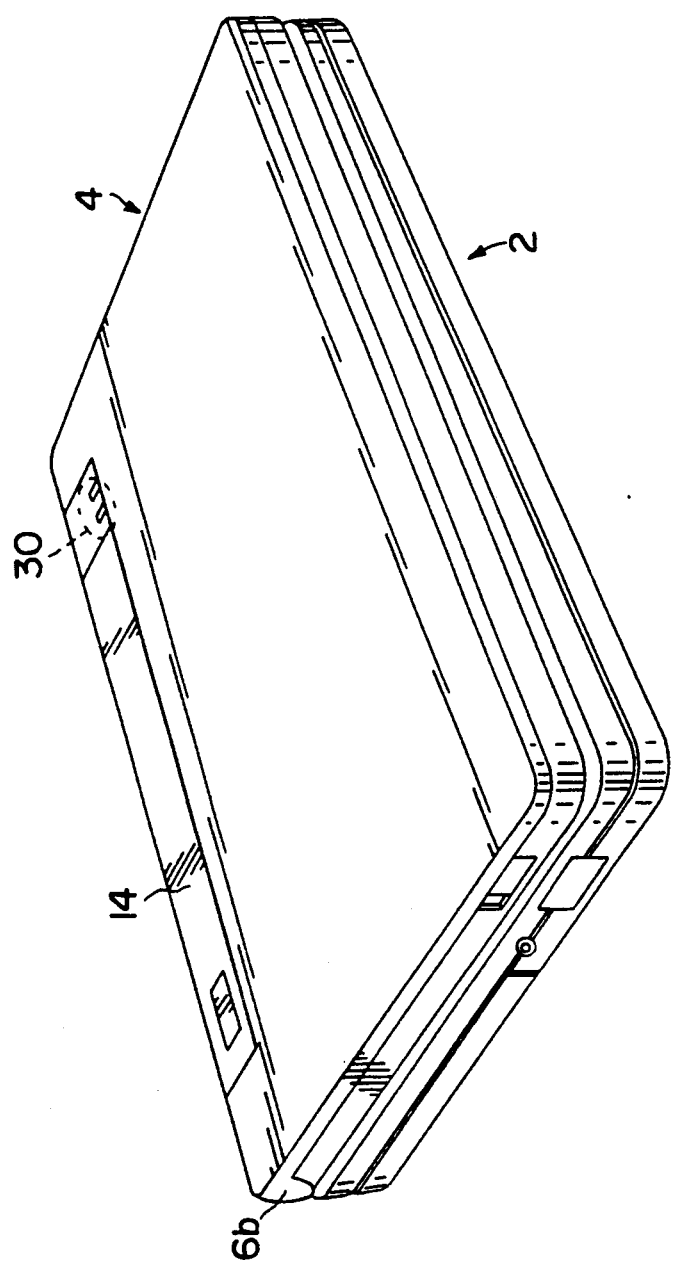
FIG. 2 is a perspective view of the embodiment of FIG. 1 with its lid portion closed.

DESCRIPTION OF THE PREFERRED EMBODIMENT:

One preferred embodiment of the present invention will now be described with reference to the accompanying drawings. FIGS. 1 and 2 illustrate a portable computer embodying the invention. The embodiment comprises a body 2 having right and left sides 2a and 2b, a lid portion 4 and a pair of hinges 6a and 6b. The body 2 and the lid portion 4 are rotatably coupled with a rotating shaft C having an axis C via the hinges 6a and 6b. For operation, the embodiment has its lid portion 4 opened as shown in FIG. 1. With its lid portion 4 closed for nonuse as depicted in FIG. 2, the embodiment resembles a book that is easy to carry around. The body 2 has a battery chamber 14 located between the hinges 6a and 6b. The battery chamber 14 contains two rows of three serially connected batteries each. This battery layout reduces the depth of the battery chamber 14 and keeps the battery chamber 14 from interfering with the lid portion 4 as the latter rotates on the hinges.

Figure 4:
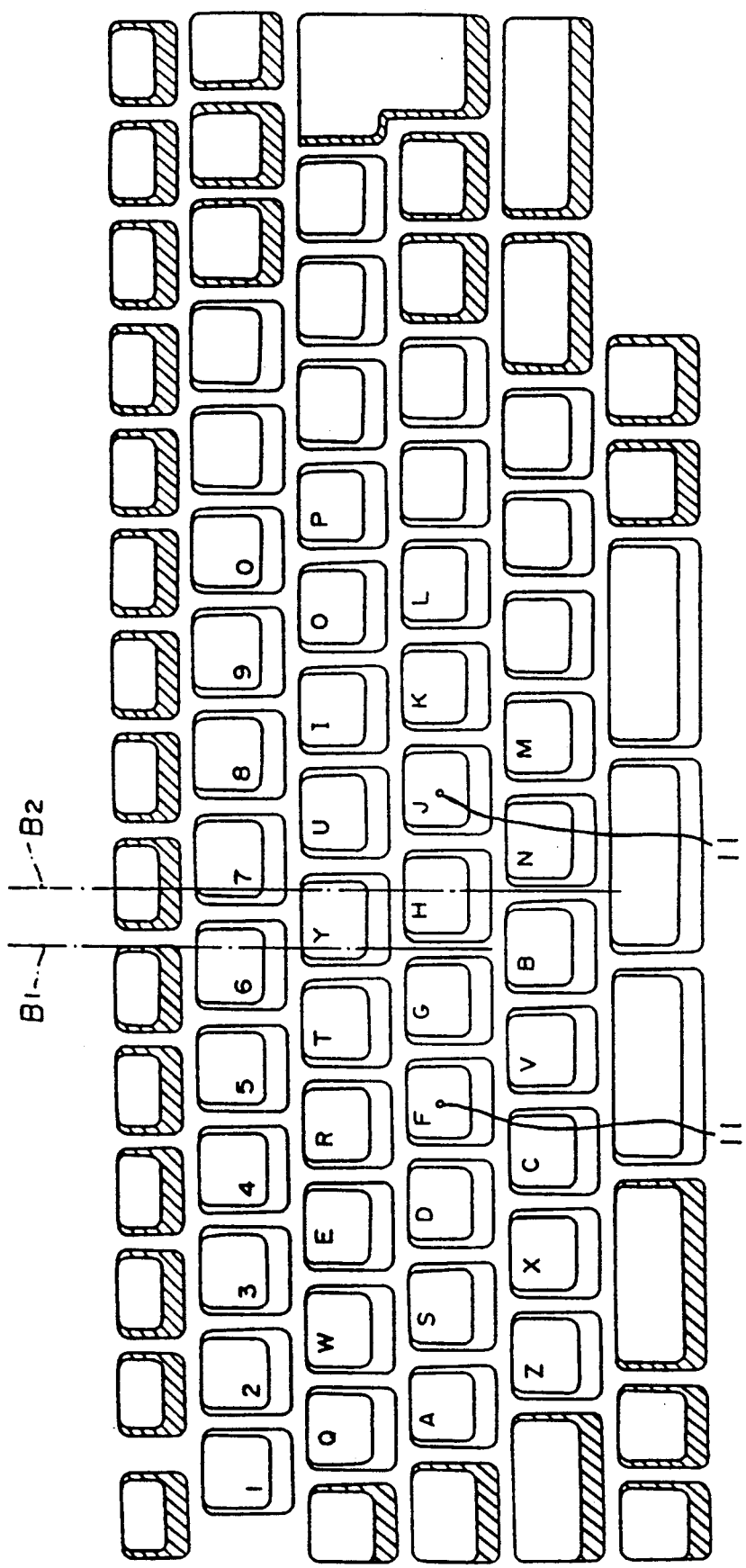
FIG. 4 is an enlarged plan view of the embodiment of Fig. 1.

Referring also to FIG. 4, on the body 2 is a "QUERTY" keyboard 10 comprising an array of keys including 49 alphanumeric character keys (ASCII keys); 10a suitable for use with ASCII characters (the unshaded keys in FIG. 4), that is, keys whose individual depression produces on ASCII character (40 of which keys are "basic" keys whose positions in four rows of 10 keys each do not vary on different QUERTY keyboards and are enclosed by a dashed line 10c in FIG. 1), and various function keys 10b. Inside the right-hand side 2a of the body 2 is a floppy disk drive 12 that writes or reads programs and data to or from a floppy disk.

The lid portion 4 has an LCD section 22 that faces the keyboard 10 when the lid portion 4 is closed. Near the right-hand side of the LCD section 22 are a contrast adjusting rheostat 24 and a brightness adjusting rheostat 26 for adjusting the contrast and the brightness of the LCD section 22, respectively. The two rheostats are each of a sliding type so that the portion where they are incorporated is made thinner. Indicator sections 30 and 32 indicate by LED illumination the power and operating status the embodiment is currently in.

Figure 3:
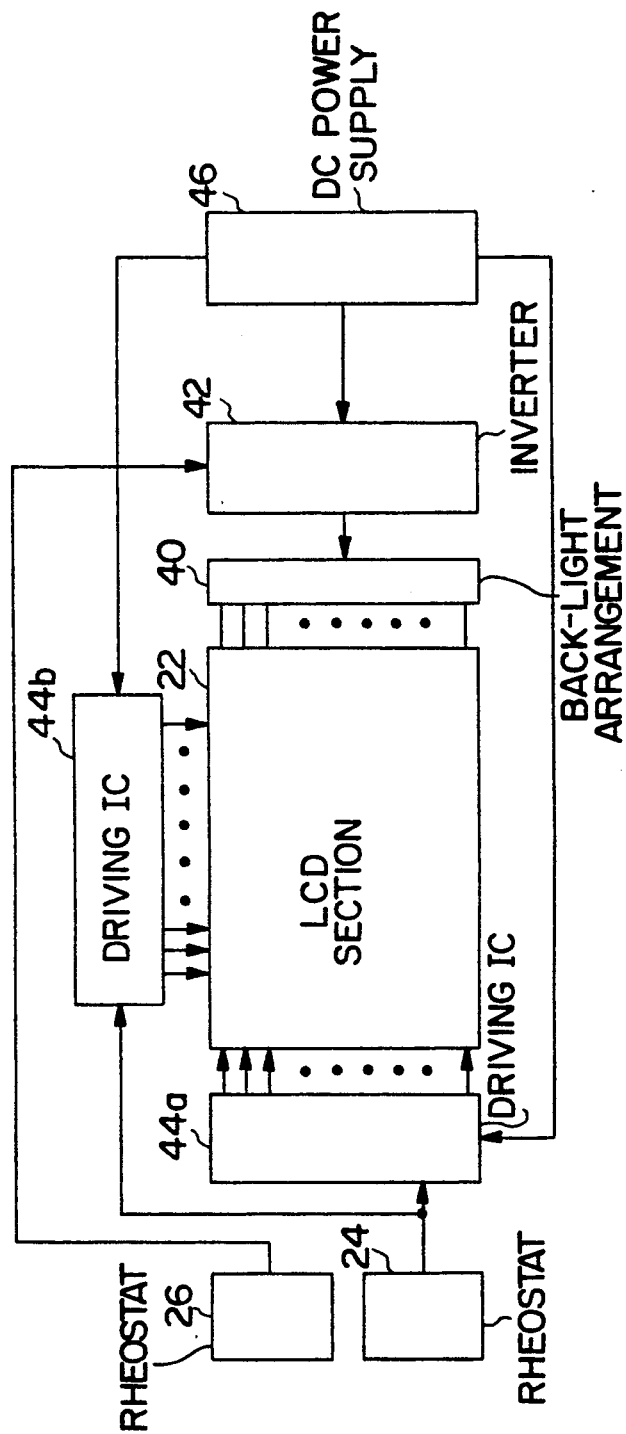
FIG. 3 is a block diagram of circuits related to an LCD section of the embodiment.

Referring to FIG. 3, a back-light arrangement 40 of the LCD section 22 is generally constituted by fluorescent elements or EL (electro-luminescence) elements. These elements are powered by an inverter 42 that supplies AC power thereto. The back-light arrangement 40 of FIG. 3 is located to the right of the LCD section 22, illuminating the LCD from the right. Driving IC's 44a and 44b supply necessary video signals to the LCD section 2. A DC power supply 46 is obtained either by tapping rechargeable batteries in the battery chamber 14 or by converting to direct currents an externally supplied commercial AC power supply.

The positional relation that the keyboard of the embodiment has with respect to the LCD section thereof will now be described with additional reference to FIG. 4. In FIG. 4, those keys that are not shaded are the ASCII keys 10a. When typing on the keys 10a, the operator always keeps his or her fingers in a "home position" for the so-called blind touch operations. To help a novice operator locate the home position on the keyboard 10, positioning marks 11 (small projections) are provided on the F and J keys where the index fingers rest.

As shown in FIG. 1, the intersection point formed by a perpendicular to the axis C' of the rotating shaft C from a given point on a line A symmetrically bisecting the LCD section 22 longitudinally and by the axis C' crossing the perpendicular is shifted to the left of a line D symmetrically bisecting the body 2 longitudinally (midway between the sides 2a and 2b). This layout is adopted so that a straight line $B_1$ equally distanced from the F and J keys (with positioning marks 11; see FIG. 4), and thus symmetrically bisecting a subarray of 10 ASCII keys consisting of the second row from the bottom within the dashed line 10c in FIG. 1; will be located on the same perpendicular plane as a longitudinally bisecting line A of the LCD section 22.

To operate the keyboard, the operator usually positions himself in such a manner that his body's center will be aligned with the center line $B_1$ between the keys having the positioning marks 11. With the typical prior art portable computer, the center line $B_1$ between the keys with the positioning marks 11 is not located on the same perpendicular plane as the line A symmetrically bisecting the LCD section 22 longitudinally. This requires the operator to turn his face or eyes sideways to look at the LCD section 22, making the typing operation uncomfortable. With the embodiment of the invention, by contrast, the center line $B_1$ is on the same perpendicular plane as the line A. This allows the operator to look straight at the LCD section 22, i.e., without having to turn his face or eyes sideways, thereby making the typing operation more comfortable and efficient.

The embodiment described above is intended to enhance the operability of the portable computer from the view-point of the relationship between the positioning marks and the LCD section. This particular feature involves one perpendicular plane containing two lines, one of the lines being the line A symmetrically bisecting the LCD section 22 longitudinally, the other line B1 being equally distanced from the F and J keys in the ASCII key arrangement. However, this feature is not limitative of the present invention and many other variations may be made. For example, the operability of the keyboard will be improved with respect to a subarray of keys consisting of the ASCII keys on the bottom row of the ASCII key arrangement as follows: The line A symmetrically bisecting the LCD section 22 longitudinally may exist on the same plane as a line $B_2$ equally distanced from the B and the N keys at the center of the bottom key row in the ASCII key arrangement. This variation takes into account the fact that different people operate keys by positioning themselves in different manners. In particular, a considerable number of users who are not used to operating keyboards having the ASCII home position prefer aligning their body's center with the center line $B_2$ between the B and the N keys.

With the above-described embodiment, the LCD section is shifted a little to the left from the center. However, the left-shifted LCD installation in not limitative of the present invention. Alternatively, as on the conventional portable computer, the LCD section may be aligned in center line with the lid portion, the longitudinal center line of the LCD section being also aligned with the center line ($B_1$ or $B_2$) of the keyboard.

The LCD section of the embodiment will now be described in more detail. As mentioned above, the longitudinally bisecting center of the LCD section 22 is shifted to the left of the center of the body 2, as illustrated in FIG. 1. This leaves a free space on the right-hand side of the lid portion 4. Inside the free space of the lid portion 4 is the inverter 42 for driving the back-light arrangement 40 of the LCD section 22. On the surface of the free space of the lid portion 2 are the contrast adjusting rheostat 24 and the brightness adjusting rheostat 26. This in turn affords the body 2 a free space where the inverter was conventionally incorporated. This space in the body 2 may be used to accommodate hardware for performing new functions, such as a hard disk drive.

Positioning the contrast adjusting rheostat 24 and the brightness adjusting rheostat 26 close to the LCD section 22 is desirable for facilitating the contrast and brightness adjustments. This layout provides an additional benefit of shortening the wiring between the inverter 42 and the back-light arrangement 40, between the brightness adjusting rheostat 26 and the inverter 42, and between the contrast adjusting rheostat 24 and the driving IC's 44a and 44b.

The indicators of the embodiment will now be described in more detail. The indicators are divided into two sections. One indicator section 30 comprises the power-related indicators and is located next to the battery chamber 14 of the body 2. The other indicator section 32 is made up of the operation-related indicators and is located on a portion of the lid portion 4 to the right of the display section 22; and The operation-related indicator section 32 includes an indicator for displaying the operating status of the floppy disk drive 12, an indicator for showing the font of characters displayed on the LCD section 22, and an indicator fox indicating the operating status of a hard disk drive that may be attached. The elements constituting the indicator section 32 are manufactured so small that the lid portion 4, despite its limited space, accommodates the indicator section 32 and all its related circuits.

The power-related indicator section 30 includes an indicator for indicating whether power is on or off, an indicator for revealing the charged status of the batteries, an indicator for displaying the connection status of an AC adapter. Positioning the power-related indicator section 30 next to the battery chamber 14 is convenient for internally installing the wiring between the battery chamber 14 and the indicator section 30. In addition, the power-related indicator section 30 allows the power status to be known regardless of the lid portion 4 being closed or opened; there is no need for the user to open the lid portion 4 to know whether power is turned on or off or whether the batteries are charged.

As described, the portable computer embodying the invention has the inverter 42, the contrast adjusting rheostat 24, the brightness adjusting rheostat 26 and the operation-related indicator section 32 mounted on the lid portion 4. This layout affords the body 2 a free space where these parts and their peripheral circuits are conventionally accommodated. Because the battery chamber 14 is located between the hinges 6a and 6b and because more circuit elements are housed in the unit space, an additional space is made available for incorporating more features such as a hard disk drive (not shown in the figures). In this manner, the embodiment offers enhanced computer capabilities while maintaining its ability as a portable computer to be carried around with ease.

While a preferred embodiment of the invention has been described using specific terms, such description is for illustrative purposes only, and it is to be understood that changes and variations may be made without departing from the spirit or scope of the invention as set forth in the following claims.

What is claimed is:

1. A portable computer comprising:
   body bound by opposite body sides which are spaced from each other in a longitudinal direction, said body having an array of keys, said array of keys including a subarray of alphanumeric keys whose operation records alphanumeric American Standard Code for Information Exchange (ASCII) characters for display, wherein, for a subarray line perpendicular to said longitudinal direction and symmetrically bisecting said subarray, said subarray line is displaced in said longitudinal direction from a body line perpendicular to said longitudinal direction and symmetrically bisecting said body;

a lid including a display section for displaying the alphanumeric ASCII characters according to signals generated by operation of the keys of said array; and a hinge portion connecting said lid with said body for rotation of said lid about an axis which extends in the longitudinal direction, wherein said subarray line, and a display line which is perpendicular to said longitudinal direction and symmetrically bisects said display section, are located in a plane which is perpendicular to said axis, said array comprising a plurality of lines of keys, the lines extending in said longitudinal direction, said subarray consisting of a plurality of the keys in one of said lines, two keys in said one line of keys having position marks formed thereon, the subarray line being equidistantly spaced from said two keys.

2. A portable computer, comprising a body bound by opposite body sides which are spaced from each other in a longitudinal direction, said body having an array of keys, said array of keys including a subarray of alphanumeric keys whose operation records alphanumeric American Standard Code for Information Exchange (ASCII) characters for display, wherein, for a subarray line perpendicular to said longitudinal direction and symmetrically bisecting said subarray, said subarray line is displaced in said longitudinal direction from a body line perpendicular to said longitudinal direction and symmetrically bisecting said body;

a lid including a display section for displaying the alphanumeric ASCII characters according to signals generated by operation of the keys of said array; and a hinge portion connecting said lid with said body for rotation of said lid about an axis which extends in the longitudinal direction, wherein said subarray line, and a display line which is perpendicular to said longitudinal direction and symmetrically bisects said display section, are located in a plane which is perpendicular to said axis, said array comprising a QWERTY arrangement of keys, said subarray consisting of a line of ten keys of said QWERTY arrangement, extending in said longitudinal direction, the line of ten keys consisting of the Z key, the X key, the C key, the V key, the B key, the N key, the M key, and three keys immediately to the right of the M key, so that the subarray line is equidistantly spaced form the B and N keys.

3. A portable computer according to claim 2, wherein, for a display line perpendicular to said longitudinal direction and symmetrically bisecting said display section, said display line is displaced in said longitudinal direction from a lid line perpendicular to said longitudinal direction and symmetrically bisecting said lid.

4. A portable computer according to claim 2, wherein said hinge portion includes a rotatable shaft, said shaft rotatably supporting said lid on said body.

5. A portable computer, comprising a body bound by opposite body sides which are spaced from each other in a longitudinal direction, said body having an array of keys, said array of keys including a subarray of alphanumeric keys whose operation records alphanumeric American Standard Code for Information Exchange (ASCII) characters for display, wherein, for a subarray line perpendicular to said longitudinal direction and symmetrically bisecting said subarray, said subarray line is displaced in said longitudinal direction from a body line perpendicular to said longitudinal direction and symmetrically bisecting said body;

a lid including a display section for displaying the alphanumeric ASCII characters according to signals generated by operation of the keys of said array; and a hinge portion connecting said lid with said body for rotation of said lid about an axis which extends in the longitudinal direction, wherein said subarray line, and a display line which is perpendicular to said longitudinal direction and symmetrically bisects said display section, are located in a plane which is perpendicular to said axis, said array comprising a QWERTY arrangement of keys, said subarray consisting of a line of keys of said QWERTY arrangement, extending in said longitudinal direction, two keys in said line of keys having position marks formed thereon, the subarray line being equidistantly spaced from said two keys.

6. A portable computer according to claim 5, wherein, for a display line perpendicular to said longitudinal direction and symmetrically bisecting said display section, said display line is displaced in said longitudinal direction from a lid line perpendicular to said longitudinal direction and symmetrically bisecting said lid.

7. A portable computer according to claim 6, wherein said lid has opposite, spaced apart, first and second sides bounding said lid on respective opposite sides of said lid line, said display section being located closer to said first side than to said second side, further comprising means, on a portion of said lid between said display section and said second side, for adjusting an image on said display section.

8. A portable computer according to claim 7, wherein said adjusting means includes sliding-type rheostats, located on the portion of said lid between said display section and said second side, respectively for adjusting the brightness and contrast of the image.

9. A portable computer according to claim 6, wherein said lid has opposite, spaced apart, first and second sides bounding said lid on respective opposite sides of said lid line, said display section being located closer to said first side than to said second side, further comprising an operation-related indicator section mounted on a portion of said lid between said display section and said second side.

10. A portable computer according to claim 5, wherein said two keys are the F and J keys.

11. A portable computer according to claim 5, wherein said hinge portion includes a rotatable shaft, said shaft rotatably supporting said lid on said body.

12. A portable computer, comprising a body having opposite body sides spaced from each other in a longitudinal direction, said body including an array of keys, said array of keys including a subarray of alphanumeric keys whose operation records alphanumeric American Standard Code for Information Exchange (ASCII) characters for display, wherein, for a subarray line perpendicular to said longitudinal direction and symmetrically bisecting said subarray, said subarray line is displaced in said longitudinal direction from a body line perpendicular to said longitudinal direction and symmetrically bisecting said body;

a lid including a display section for displaying the alphanumeric ASCII characters according to signals generated by operation of the keys of said array, said display section including a back-light arrangement, wherein, for a display line perpendicular to said longitudinal direction and symmetrically bisecting said display section, said display line is displaced in said longitudinal direction from a lid line perpendicular to said longitudinal direction and symmetrically bisecting said lid, said lid having opposite, spaced apart, first and second sides bounding said lid and equidistantly spaced from said lid line on respective opposite sides of said lid line, said display section being located closer to said first side than to said second side;

a hinge portion connecting said lid with said body for rotation of said lid about an axis which extends in the longitudinal direction, wherein said subarray line and said display line are located in a plane which is perpendicular to said axis;

means, on a portion of said lid between said display section and said second side, for adjusting an image on said display section, said adjusting means including sliding-type rheostats, located on the portion of said lid between said display section and said second side, respectively for adjusting the brightness and contrast of the image; and inverter means, located on the portion of said lid between said display section and said second side, for driving said back-light arrangement.

13. A portable computer according to claim 12, wherein said array comprises a QWERTY arrangement of keys, said subarray consisting of a line of ten keys extending in said longitudinal direction, the line of ten keys consisting of the Z key, the X key, the C key, the V key, the B key, the N key, the M key, and three keys immediately to the right of the M key, so that the subarray line is equidistantly spaced from the B and N keys.

14. A portable computer according to claim 12, wherein said array comprises a QWERTY arrangement of keys, said subarray consisting of a line of keys in said QWERTY arrangement extending in said longitudinal direction, two keys in said line of keys having position marks formed thereon, the subarray line being equidistantly spaced from said two keys.

15. A portable computer according to claim 14, wherein said two keys are the F and J keys.

16. A portable computer according to claim 12, further comprising an operation-related indicator section mounted on said portion of said lid between said display section and said second boundary.

* * * * *